(12) United States Patent
Mercer et al.

(10) Patent No.: US 8,280,920 B2
(45) Date of Patent: Oct. 2, 2012

(54) NAVIGATING MEDIA CONTENT BY GROUPS

(75) Inventors: Ian Cameron Mercer, Sammamish, WA (US); Kevin Leigh LaChapelle, Redmond, WA (US); Harutoshi Miyamoto, Ibaraki (JP); Yoshifumi Yanagawa, Kyoto (JP); Nobuyasu Takeguchi, Kawachinagano (JP); Chiyoko Matsumi, Suita (JP)

(73) Assignees: Microsoft Corporation, Redmond, WA (US); Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 13/112,908

(22) Filed: May 20, 2011

(65) Prior Publication Data

US 2011/0218998 A1 Sep. 8, 2011

Related U.S. Application Data

(63) Continuation of application No. 12/686,234, filed on Jan. 12, 2010, now Pat. No. 7,991,803, which is a continuation of application No. 11/461,591, filed on Aug. 1, 2006, now Pat. No. 7,680,814, which is a continuation of application No. 11/168,060, filed on Jun. 28, 2005, now Pat. No. 7,668,842, and a continuation of application No. 11/167,963, filed on Jun. 28, 2005, now Pat. No. 7,707,231, said application No. 11/168,060 is a continuation-in-part of application No. 10/273,415, filed on Oct. 17, 2002, now Pat. No. 7,043,477, said application No. 11/167,963 is a continuation-in-part of application No. 10/273,415.

(60) Provisional application No. 60/418,973, filed on Oct. 16, 2002.

(51) Int. Cl.
*G06F 17/30* (2006.01)

(52) U.S. Cl. ........... 707/803; 707/769; 709/219; 84/609

(58) Field of Classification Search .................. 707/802, 707/803, 713, 769, 913, 916, 954; 709/219; 84/608, 609
See application file for complete search history.

(56) References Cited

U.S. PATENT DOCUMENTS

| | | | | |
|---|---|---|---|---|
| 5,428,732 A | * | 6/1995 | Hancock et al. | 715/201 |
| 5,616,876 A | * | 4/1997 | Cluts | 84/609 |
| 5,742,347 A | * | 4/1998 | Kandlur et al. | 375/240.25 |
| 5,870,553 A | * | 2/1999 | Shaw et al. | 709/219 |
| 5,892,535 A | * | 4/1999 | Allen et al. | 725/36 |
| 5,996,015 A | * | 11/1999 | Day et al. | 709/226 |
| 6,006,234 A | * | 12/1999 | Govindarajan et al. | 707/803 |
| 6,199,059 B1 | * | 3/2001 | Dahan et al. | 707/803 |
| 6,201,540 B1 | * | 3/2001 | Gallup et al. | 715/764 |
| 6,212,524 B1 | * | 4/2001 | Weissman et al. | 707/600 |
| 6,240,407 B1 | * | 5/2001 | Chang et al. | 707/711 |
| 6,256,031 B1 | * | 7/2001 | Meijer et al. | 715/854 |

(Continued)

FOREIGN PATENT DOCUMENTS

WO 2004/061850 A1 7/2004

*Primary Examiner* — Shahid Alam
(74) *Attorney, Agent, or Firm* — Senniger Powers LLP

(57) ABSTRACT

Grouping media files via playlists on a computer-readable medium. One or more media files are selected according to a grouping criterion to define one or more playlists from the media files. A container group is associated with the playlists and stores values identifying each of the playlists associated with the container group along with references to each of the playlists.

16 Claims, 17 Drawing Sheets

U.S. PATENT DOCUMENTS

| | | | |
|---|---|---|---|
| 6,263,341 B1 * | 7/2001 | Smiley | 707/812 |
| 6,269,394 B1 * | 7/2001 | Kenner et al. | 709/217 |
| 6,282,548 B1 * | 8/2001 | Burner et al. | 707/723 |
| 6,311,194 B1 * | 10/2001 | Sheth et al. | 715/236 |
| 6,356,921 B1 * | 3/2002 | Kumar et al. | 715/203 |
| 6,363,377 B1 * | 3/2002 | Kravets et al. | 707/723 |
| 6,389,426 B1 * | 5/2002 | Turnbull et al. | 707/661 |
| 6,405,215 B1 * | 6/2002 | Yaung | 707/802 |
| 6,430,575 B1 * | 8/2002 | Dourish et al. | 707/713 |
| 6,449,341 B1 * | 9/2002 | Adams et al. | 379/9 |
| 6,484,156 B1 * | 11/2002 | Gupta et al. | 707/802 |
| 6,487,663 B1 | 11/2002 | Jaisimha et al. | |
| 6,526,411 B1 * | 2/2003 | Ward | 707/803 |
| 6,545,209 B1 * | 4/2003 | Flannery et al. | 84/609 |
| 6,557,042 B1 * | 4/2003 | He et al. | 709/231 |
| 6,657,117 B2 * | 12/2003 | Weare et al. | 84/668 |
| 6,661,437 B1 * | 12/2003 | Miller et al. | 715/810 |
| 6,721,489 B1 * | 4/2004 | Benyamin et al. | 386/243 |
| 6,728,729 B1 * | 4/2004 | Jawa et al. | 707/803 |
| 6,735,628 B2 * | 5/2004 | Eyal | 709/223 |
| 6,760,721 B1 * | 7/2004 | Chasen et al. | 707/803 |
| 6,839,059 B1 * | 1/2005 | Anderson et al. | 345/501 |
| 6,865,431 B1 * | 3/2005 | Hirota et al. | 700/94 |
| 6,993,532 B1 * | 1/2006 | Platt et al. | 707/736 |
| 7,054,888 B2 | 5/2006 | LaChapelle et al. | |
| 7,647,297 B2 | 1/2010 | LaChapelle et al. | |
| 2001/0018727 A1 * | 8/2001 | Ando et al. | 711/112 |
| 2003/0221541 A1 * | 12/2003 | Platt | 84/609 |
| 2004/0019396 A1 * | 1/2004 | McMahon et al. | 700/94 |
| 2004/0215718 A1 * | 10/2004 | Kazmi et al. | 709/203 |
| 2004/0236568 A1 * | 11/2004 | Guillen et al. | 704/201 |

* cited by examiner

NAVIGATING MEDIA CONTENT BY GROUPS

CROSS-REFERENCE TO RELATED APPLICATIONS

This application is a continuation of U.S. patent application Ser. No. 12/686,234, filed Jan. 12, 2010, which is a continuation of U.S. patent application Ser. No. 11/461,591, filed Aug. 1, 2006, now U.S. Pat. No. 7,680,814, which is a continuation of U.S. patent application Ser. No. 11/168,060, filed Jun. 28, 2005, now U.S. Pat. No. 7,668,842, and U.S. patent application Ser. No. 11/167,963, filed Jun. 28, 2005, now U.S. Pat. No. 7,707,231, both of which are continuations-in-part of U.S. patent application Ser. No. 10/273,415, filed Oct. 17, 2002, now U.S. Pat. No. 7,043,477, which claims the benefit of U.S. Provisional Patent Application Ser. No. 60/418,973, filed Oct. 16, 2002, all of which are hereby incorporated herein by reference in their entirety for all purposes.

BACKGROUND

Due to recent advances in technology, computer users are now able to enjoy many features that provide an improved user experience, such as playing various media and multimedia content on their personal or laptop computers. For example, most computers today are able to play compact discs (CDs) so users can listen to their favorite musical artists while working on their computers. Many computers are also equipped with digital versatile disc (DVD) drives enabling users to watch movies.

In some multimedia environments, a computer has access to a computer-readable medium storing compressed media files such as audio files. The computer typically organizes the media files into playlists when the compressed media files are played on the computer. For example, in the case of audio media files, the files may be organized by album, artist, genre, date, or some user specified selection and ordering. A user easily navigates through this organization using menus and graphical displays to render the desired media files. However, the same organization and navigation are not possible with presently available systems when the media files are copied to a writeable CD or writeable DVD and rendered in a portable CD player, car receiver, DVD player, or any other consumer electronic device. Such devices typically suffer from a low power processor, limited memory availability, limited display, and/or limited user input capabilities. That is, navigation of media files organized in a directory structure on a removable medium by a presently available consumer electronic device at most includes only a flat forward/backward navigation metaphor through each of the directories. Presently available systems lack a data structure to represent multiple parallel groupings of the media files.

SUMMARY

Embodiments of the invention include software for grouping media files on a computer-readable medium. In an embodiment, a method creates sub-groups of media files within a group by selecting one or more media files according to a grouping criterion to define a first playlist from the media files. The first playlist references each of the selected media files. A folder associated with the first playlist is created to store a first value identifying the first playlist, a second value identifying a second playlist, a first reference to the first playlist, and a second reference to the second playlist.

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Other features will be in part apparent and in part pointed out hereinafter.

BRIEF DESCRIPTION OF THE DRAWINGS

Corresponding reference characters indicate corresponding parts throughout the drawings.

DETAILED DESCRIPTION

Figure 1:
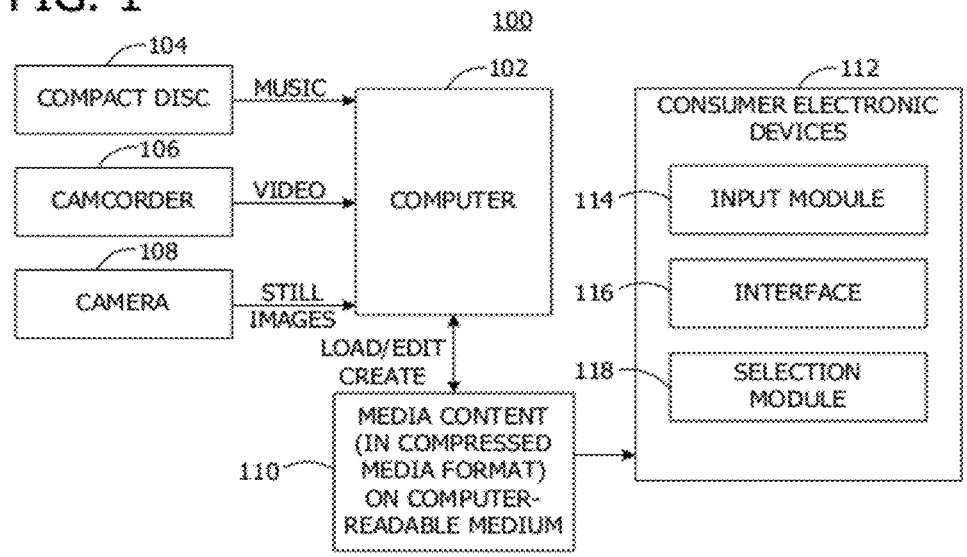
FIG. 1 is a block diagram illustrating one example of a suitable media environment in which embodiments of the invention may be implemented.

Embodiments of the invention include, but are not limited to, authoring software and playback software. In an embodiment, the authoring software is for use on a computing device such as a personal computer and playback software for use on a computing device such as a consumer electronic device. The authoring software selects one or more media files according to a grouping criterion to define a group from the media files. The defined group references each of the selected media files. The authoring software generates a group header associated with the group. In an embodiment, the group header comprises a folder associated with the group. Alternatively or in addition, a container or a container group corresponds to the group header. The group header includes a value identifying the defined group and a reference to another group to enable navigation. The authoring software stores the selected media files, the defined group, and the associated group header on a computer-readable medium. The playback software allows a user to navigate and select media files via groups within a playlist. In one embodiment, the invention software is operable as part of a compressed media format (see FIG. 10) having a set of small files containing metadata, menus, and playlists in a compiled binary format designed for playback on feature-rich personal computer media players as well as low cost media players. For example, a typical low-end portable CD player might have as little as one hundred kilobytes of working memory, an eight-bit central processing unit running at only one megahertz and a very slow CD-drive mechanism with a maximum seek time of nearly five seconds. The format encompasses audio, still images, and video in various formats.

The playlist is a convenient way to organize groups of audio, video, and image files. A user creates playlists for different performers or different kinds of music or videos. The user can manipulate the created playlists by shuffling or repeating the playlists. With embodiments of the invention, playlists such as "all songs by genre" are created automatically and written to a removable computer-readable medium whenever the user copies music files to the removable computer-readable medium. Unlike playlists on the personal computer, which are simple flat lists of media files, the playlists in embodiments of the invention include one or more groups that allow the user to use a simple navigation metaphor such as 'Next' and 'Previous' to navigate within the groups to the desired album, artist, genre, etc. Groups are stored in an efficient format within playlists and are named so that the user can see which group is currently playing and can navigate quickly to another group even in an environment offering little option for advanced user input, such as in an automobile. Embodiments of the invention support audio, video, and images, supports transitions between images, improves user navigation, supports repeat count (e.g., kiosk), and supports parallel playback of files such as images with audio. In addition, groups can be automatically created by date so that, for example, the user can skip from one event to the next within a set of digital photographs using the same easy navigation metaphor.

In an embodiment, a playlist includes a collection of media files and each playlist represents a sub-group within a group.

Media Environment

Referring now to the drawings, FIG. 1 illustrates an exemplary multimedia environment in which an embodiment of the invention may be used. A system 100 has one or more computers 102 coupled to one or more devices providing media content. For example, the devices may include a CD 104, a camcorder 106, or a camera 108. The computer 102 accesses the media content as input and can render or store the media content as a digital media file to a computer-readable medium 110 as described with reference to FIG. 4 and FIG. 5 below.

In one embodiment, the computer 102 stores media content on a computer-readable medium 110 for use by a media player program associated with a consumer electronic device 112. The consumer electronic device 112 includes any suitable rendering filter or media player or device that is configured to render digital media so that the user can experience the content that is embodied on the medium 110. For example, suitable media player applications include a CD media player and a DVD media player.

In an embodiment of the invention, the media players, consumer electronic devices 112, or the like may be organized into three exemplary levels according to the capabilities of the media player. Each media player has a media type that identifies the type of media that the media player is capable of rendering. For example, the media type (also referred to as a playlist summary type, a menu summary type, or the like) includes one or more of the following: audio, video, and still image. Level 1 media players include audio-only players such as portable CD players, car receivers, and DVD players. In addition to Level 1 media players, level 2 media players include audio and still image capable players including portable and set-top DVD players optionally capable of rendering images with audio simultaneously. Level 3 media players include level 2 media players and audio, still image, and video capable players. Exemplary consumer electronic devices 112 include, but are not limited to, the following: a portable CD player, an MP3 player, an audio system in an automobile, a personal digital assistant, a cellular telephone, or the like.

A media player according to an embodiment of the invention includes software allowing navigation among groups of media files. An exemplary consumer electronic device 112 or media player includes an input module 114, an interface module 116, and a selection module 118. The input module 114 reads a playlist group referencing one or more media files. For example, the media files may be stored on a computer-readable medium. The playlist group includes a group header and group data from a computer-readable medium. The group header includes a value identifying the playlist group and references to other playlist groups. The value corresponds to a group description associated with the playlist group. For example, the group header may include a memory location offset to a next playlist group, a memory location offset to a previous playlist group, or a pointer to a memory location associated with another playlist group. The interface module 116 displays the group description to a user. The selection module 118 navigates, responsive to input from the user, to another playlist group via the reference in the group header.

Playlists

A playlist is a convenient way to organize groups of audio, video, and image files on a computer-readable medium. The playlist may include, but is not limited to, one or more of the following: a media file, a group of audio files, a group of video files, a group of timed image sequences, and a group of complex parallel combinations of images with audio. For example, a user may create playlists for different performers or different kinds of music or videos. The user also can manipulate the created playlists by shuffling or repeating the playlists. Such shuffle or random play options may operate at the group level or at the individual media file level, which allows, for example, playback of all songs by a random artist before proceeding to the next random artist. Playlists allow the user to easily view a listing of media files to sort, search, and quickly navigate.

Figure 2A:
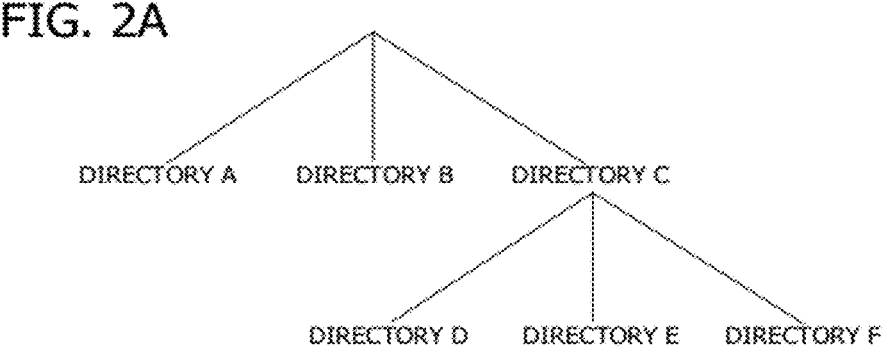
FIG. 2A is an exemplary block diagram of a hierarchical directory structure.
Figure 2B:
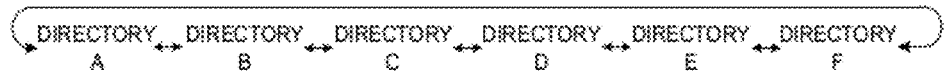
FIG. 2B is an exemplary block diagram illustrating navigation of the flattened directory structure from FIG. 2A by presently available systems.

Each playlist includes a flat list of media files and the playlists may be organized in a hierarchical data structure such as illustrated in FIG. 2A. In FIG. 2A, a root directory includes playlist A, playlist B, and playlist C. Playlist C further includes some media files along with playlist D, playlist E, and playlist F in this example. On a computer such as a personal computer with sufficient memory and processor speed, the user can navigate the hierarchical structure via a sophisticated or rich media player to easily select the desired playlist and render the content in the selected playlist via a media player. However, the computing logic, resources, playlists, and media files associated with presently available media players and consumer electronic devices such as a CD player or MP3 player lack the capability to allow a user to perform such direct navigation and selection. At best, computing logic in an existing consumer electronic device flattens the hierarchical structure and allows simple forward/backward navigation through the entire flattened structure as illustrated in FIG. 2B. In FIG. 2B, the user is able to only step forward or backward through the entire ordered, flattened structure: playlist A, playlist B, playlist C, playlist D, playlist E, and playlist F. The user is unable to navigate among a select group of playlists in the ordered, flattened structure of some existing systems or navigate the media files in any other manner.

Groups within Playlists

An embodiment of the invention software creates playlists automatically and writes them to a removable computer-readable medium in a specific binary format (see below) whenever the user copies media files to the removable computer-readable medium 110 for rendering on the consumer electronic device 112. Software to create compliant computer-readable media might, for example, create a playlist 'All songs grouped by artist' and another 'All images grouped by month taken.' Unlike presently available playlists, which are simple flat lists of media files, the playlists of an embodiment of the invention include one or more groups (e.g., album, artist, genre, or date) that allow the user to use a simple navigation metaphor such as 'Next' and 'Previous' to navigate to the desired group within the playlist. This type of navigation according to an embodiment of the invention is possible on a computer as well as on a consumer electronic device with limited resources such as a small display, a television screen, or a remote infrared (IR) keypad.

Figure 3:
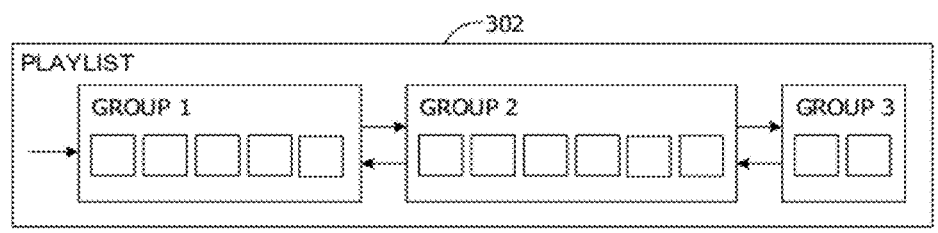
FIG. 3 is an exemplary block diagram illustrating groups within a playlist.

As illustrated in FIG. 3, groups within a playlist 302 allow a simple 'next group'/'previous group' capability to skip album-by-album, artist-by-artist, genre-by-genre, film-roll-by-film-roll, directory-by-directory or any other logical grouping of media files to select and render the desired set of media files. In FIG. 3, the user can navigate sequentially forward and backward among Group 1, Group 2, and Group 3 in the playlist 302.

In a car audio example, the user can navigate the media content via groups within playlists (e.g., the user simply presses 'Next Group' and sees the name of the group now playing) with minimal effort and distraction. In one embodiment, a 'Next Group' and a 'Previous Group' button provide this capability (possibly overloading the 'Next Chapter' and 'Previous Chapter' buttons on a DVD remote control or the 'Next Track' and 'Previous Track' buttons on a CD player). Some advanced media players (e.g., one with a remote IR keypad and a connected TV display) might even provide a drop-down, or other style of menu for group selection within a playlist allowing users to get quickly to a specific group without having to step through them sequentially.

The computer-readable medium 110 stores groups in an efficient format within playlists (e.g., playlist 302). The groups are named so that the user can see which group is currently playing. Each group has a name that will typically be displayed while that group is playing (although in the case of video or image files it might not be displayed or it might be displayed for only a few seconds after skipping).

Each media type (audio, images, video) stored in a playlist may be grouped. In one embodiment, grouping information is stored in a header with one or more actual group lists (audio, images, video, and parallel type). The offsets to next and previous group fields allow media players to navigate quickly to the next or previous group in the playlist. In another embodiment, pointers or other links to the next and previous groups replace the offsets. A group number is a reference in a separate name table so that the media player can display the name of the group currently playing. Group numbers may be reused in order to conserve name space (e.g. if Group 345 was 'June 2002' then '345' could be used in an image playlist and in a video playlist to represent all the images or video captured during June 2002). The group number in the playlist file is unique for all groups. The Text name may be reused because there uniqueness is not required. The actual files may be represented in any number of groups in any number of different ways.

Authoring Software

Figure 4:
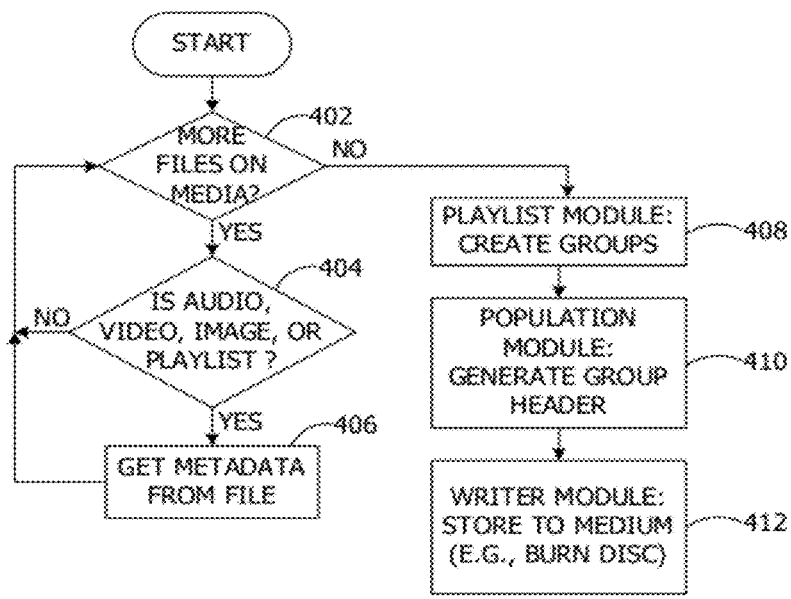
FIG. 4 is a flow chart illustrating exemplary operation of authoring software according to an embodiment of the invention.

As illustrated in FIG. 4, exemplary authoring software, a creation application program, or the like groups one or more input media files. Proceeding from 402, for each input media file, the authoring software determines at 404 if the input media file includes audio data, video data, image data, or a playlist. If the input media file includes such data, then metadata is obtained from the input media file for use in defining groups at 406. If there are no more files on the input medium, as determined at 402, the authoring software selects one or more media files from the input media files according to a grouping criterion to define a group at 408. The defined group references the selected media files.

One or more grouping criteria may exist in an embodiment, resulting in one or more defined groups of media files (e.g., playlists). Grouping criteria may include, for example, user-selected grouping criteria (e.g., favorite songs of the 80s) or default grouping criteria (e.g., all songs by artist). Depending on the particular grouping criteria, the defined playlists may share one or more media files, or be completely different. In an embodiment, first and second grouping criteria define first and second playlists, respectively. A first value identifies the first playlist while a second value identifies the second playlist. In an embodiment, the first and second values include names for the first and second playlists, respectively, to enable displaying the names to the user during playback and/or selection of the playlists.

The references include, but are not limited to, a memory location offset to the selected media files a pointer to a playlist referencing the selected media files, or a pointer to the selected media files. At 410, the authoring software generates a group header associated with the group. The group header includes a value identifying the defined group and references to the preceding and following group to enable navigation between the groups. At 412, the authoring software also stores the selected media files, the defined group, and the associated group header on a computer-readable medium. For example, the authoring software may include, or interface with, software to burn a CD.

In a media authoring tool according to an embodiment of the invention, one or more computer-readable media have computer-executable components for grouping media files as described herein and illustrated in FIG. 4. The media files include, but are not limited to, one or more of the following: an audio file, a video file, and a still image file. The components include a playlist module for selecting the media files according to a grouping criterion to define a group from the input media files. In one embodiment, the playlist module is responsive to input from a user. For example, the user may specify the grouping criterion to select the media files according to artist, genre, album, date, directory name, or other criteria including user-defined groupings of the media files. The components also include a population module for generating a group header associated with the group. The group header references another group. For example, the group header may include a memory location offset, pointer, or other reference to a next group and/or a previous group. The components also include a writer module for storing the selected media files, the defined group, and the associated group header on a computer-readable medium. In one embodiment, the components also include an input module for parsing the input media files to determine a playlist summary type associated with each of the media files. The playlist summary type identifies each of the parsed media files as comprising audio data, video data, or image data. The input module also reads an input playlist to define a group from the read playlist.

In one embodiment, the authoring software for creating groups within playlists and storing the groups on a computer-readable medium executes automatically whenever the selection of files to be written to a computer-readable medium includes primarily audio, video or still images. In addition, the authoring software executes whenever the application program detects an existing set of groups within playlists already on the medium. The authoring software also executes whenever the user attempts to write media files to the medium. The selected media files may be organized according to an existing structure.

In operation, the authoring software in an embodiment of the invention includes a computer-implemented method of creating sub-groups of media files within a group. The method includes selecting one or more media files according to a grouping criterion to define a first playlist from the media files. The first playlist references each of the selected media files associated therewith. A second playlist is also defined from a selection of at least one of the media files. The second playlist references each of the selected media files associated therewith. A folder associated with the first and second playlists is created for storing a first value identifying the first playlist, a second value identifying a second playlist, a first reference to the first playlist, and a second reference to the second playlist.

Figure 5:
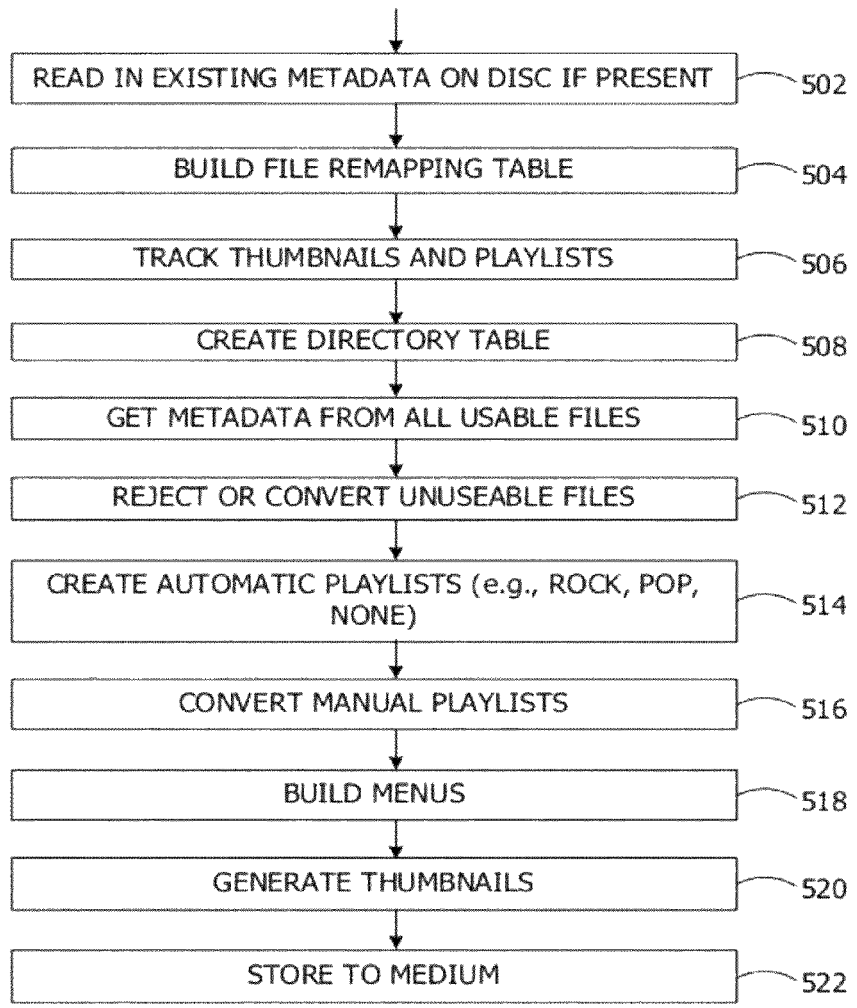
FIG. 5 is another flow chart illustrating exemplary operation of authoring software according to an embodiment of the invention.

As illustrated in FIG. 5, the authoring software analyzes all the media files that the user has selected to write to the medium to construct playlists to give the user a rich experience when the media files are rendered by a compliant media player. The authoring software parses a metadata header for every selected media file and playlist and stores the parsed information in memory. After reading in existing metadata on disk (if present) at 502, the authoring software builds a number remapping table at 504, tracks thumbnails and playlists at 506, creates a directory table at 508, and otherwise obtains metadata from all analyzed media files at 510. Proceeding to 512, any files that do not meet certain criteria (see below) during this process will be converted, rejected, and/or filtered out from the list and removed from the memory copy of any playlists in which they occur. Playlists are checked to ensure all the files they contain are present within the list of files to be written to the medium. Files not present are purged from the playlists. Any playlists that are empty as a result of these purge operations are then removed. A list of all the files removed in this way will be created and a warning issued to the user.

In one embodiment, the authoring software rejects various files that do not meet one or more of the following criteria: audio is less than 64 kbps, audio is more than 160 kbps, audio uses an unknown compressor-decompressor, MP3 file is outside allowed specification, image is not a Joint Photographic Experts Groups (JPEG) file, video frame size is larger than 720×576, interlaced video is not 480 or 576 lines, video frame rate is greater than 30 frames per second, horizontal frame size is not an allowed value, pixel aspect ratio is outside allowed range, and video bit rate is more than 1.9 Mbps. The authoring software may list the rejected files, or may group the rejected files as 'Audio', 'Images', 'Video', 'Playlists' with a number representing the number of rejected files for the group (e.g., 'Audio files (5)'). The user examines the list by expanding and collapsing sections. As the user selects each file name, the user interface explains why the file has been disallowed.

Referring further to FIG. 5, the authoring software proceeds to 514 and 516 for creating playlists, groups within the playlists, and menus based on the parsed, stored information. In particular, the authoring software creates a default set of automatic playlists, and converts any input (or manual) playlists including any M3U, ASX or WPL playlist files. Menus are built at 518, thumbnails are generated at 520, and all the necessary information is stored to the computer-readable medium at 522. The following sections describe an exemplary implementation of the playlist and menu creation operations.

Playlist and Menu Creation

This section describes an exemplary method performed by the authoring software to create playlists from the selected media files and organize the playlists in a hierarchical structure. Operation of the method is based on the type and existing organization of the selected media files. If the selected media files are in a single layer of directories, the authoring software creates a playlist such as 'All media files by directory' in which the media files are grouped by directory name in alphabetical order by file names. If two layers of directories are present and the average top level directory contains less than one and a half subdirectories and more than seventy-five percent of the second level directories contains between five and twenty-five audio files (e.g., a typical artist-album structure with only a few albums for each artist), the authoring software creates a playlist 'All media files by directory' in which the media files are grouped by <directory name 1+'-' directory name 2> in <directory name 1> then <directory name 2> in alphabetical order.

If more than two layers of directories are present or the two layers are too 'leafy' (e.g., contain too many subdirectories per directory) to readily flatten the hierarchy, then the authoring software creates a playlist 'All media files by directory' in which the media files are grouped by <lowest directory name> in the order the directories are found in the file system as the file system is traversed breadth first (not in alphabetical order). If there are any non-null playlist files present, the authoring software creates a playlist for each playlist present. Such playlists are stored under a 'Playlists' menu if there are more than five such playlists. If there are between two and six playlists present, the authoring software creates all remaining menus under a menu item entitled 'Other'

Playlists for Audio Media Files

The authoring software creates a hierarchical menu structure for organizing the created playlists. In an exemplary embodiment with audio media files, the authoring software creates groups and corresponding menus according to artist, composer, album, artist and album, genre, year, and directory (e.g., corresponding to the existing structure of the selected media files).

At the root of the hierarchical menu structure, a menu entitled 'Artists' has a submenu entitled 'All songs by artist' in which the media files are grouped by artist in alphabetical order. The authoring software creates a submenu for each artist in which the media files associated with the artist are grouped by album in alphabetical order or according to a release date for the album. If composer information is available for some of the selected media files (e.g., greater than twenty-five percent), the authoring software creates a menu 'Composer' at the root with a submenu entitled 'All songs by composer' in which the media files are grouped by composer in alphabetical order. The authoring software creates a submenu for each composer in which the media files associated with the composer are grouped by album in alphabetical order or according to a release date for the album. Media files without composer information are omitted.

The authoring software also creates a menu 'Albums' at the root with a submenu entitled 'All songs by album' in which the media files are grouped by album in alphabetical order or according to a release date for the album. The authoring software further creates a menu 'Artist-Album' at the root in which the media files are grouped according to artist-album pair (i.e., a single group is created for each artist-album pairing). The authoring software also creates a menu 'Genres' with a submenu 'All songs by genre' in which the media files are grouped by genre in alphabetical order (i.e., a single group is created for each genre). A menu 'Year' includes, but is not limited to, the submenus 'All songs by decade,' 'All songs by year,' and 'Directories.' The submenu 'All songs by decade' includes media files grouped by decade in ascending order (e.g., one group for each decade) with 'No year' songs grouped at the end of the groups or omitted. The submenu 'All songs by year' includes media files grouped by year in ascending order (e.g., one group for each year) with 'No year' songs grouped at the end of the groups or omitted. The submenu 'Directories' has groups that parallel an existing directory structure of the selected media files. That is, the submenu 'Directories' has one group for each directory (e.g. "Party Favorites", "Driving music").

Those skilled in the art will appreciate that the playlists and hierarchical structures described herein are merely exemplary. It is contemplated by the inventors that embodiments of the invention include other playlists, hierarchical structures, and the like, including any combination of audio data, video data, or still image data.

Playlists for Image Media Files

If the selected media files include still image, the authoring software creates a menu 'All pictures' at the root including every selected image for display (e.g., with a default duration of five seconds). In one embodiment, the duration can be changed via an advanced options dialog in a user interface associated with the authoring software. In addition, the authoring software examines the co-incidence of the selected images and selected music files in existing directories. If all of the directories that have images (e.g., larger than 200×200 pixels) also have music, the authoring software creates a playlist entitled "All pictures with all songs (endless)" arranged by directory so that each directory plays with the accompanying music. In one embodiment, the display time for each image equals the sum of the song lengths in the directory divided by the number of images. For example, each image may be displayed for a minimum of five seconds and a maximum of thirty seconds. The maximum and minimum settings are user adjustable in an advanced options dialog. Some images may not be displayed using this technique if the music in a directory is too short for all the images that are in the directory.

Alternatively, the playlists "All pictures with all songs (endless)" includes all songs playing in parallel with all the images. In one embodiment, the display time for each image equals the sum of the lengths of all the songs in the selected media files divided by the number of images. For example, each image is displayed for a minimum of five seconds and a maximum of thirty seconds. The maximum and minimum settings are user adjustable in an advanced options dialog. The image sequence is repeated as necessary to match the length of music or the music is repeated in the playlist to ensure there is enough music to match the total image length. Images are grouped, for example, by lowest directory name.

Playlists for Video Media Files

If the selected media files include video, the authoring software creates a menu 'Video' at the root of the hierarchical structure. The menu includes a playlist for each video file as well as a playlist for all video files entitled 'Play all videos' with video files concatenated in alphanumeric sequence. The authoring software also groups the video media files according to user input, as described in the following section.

Manual Adjustments to Automatic Playlists

The user may choose to adjust the hierarchical structure and/or default playlists. The user interface associated with the authoring software displays a diagram of the hierarchical structure and playlists with all options pre-checked for inclusion on the computer-readable medium. For example, the menu/playlist structure is displayed as a scrolling tree-view with checkboxes next to each menu or playlist item. Clearing a check box eliminates that entire branch of the tree (although the state of the items below it is preserved in case the user reinstates it).

The user interface associated with the authoring software may implement various or disable various features. For example, promote and demote buttons may not be selectable (e.g., grayed-out) if the currently selected item cannot be promoted or demoted. No choice is given to the user where to demote an item, it automatically goes under the correct heading, adding that heading if necessary. For example, if there are three video files in the top-level menu and no 'Video' menu entry, the first demotion will create a heading 'Other video', the second demotion will add to that, the third demotion will rename the heading to 'Video.' No option is given to change the order of the menus or playlists or to change their names. All names are derived from metadata in files or are automatically generated names like 'Other video.' When an individual playlist is promoted to the same level as its containing category, the containing category changes name to 'Other . . . ' (e.g. 'Other video').

Other options for the user interface associated with the authoring software include, but are not limited to, adjusting a 'Minimum image duration,' a 'Default image duration,' a 'Maximum image duration,' and a 'Repeat forever (kiosk mode).' The 'Minimum image duration' option allows the user to change the minimum duration for images (the default is, for example, five seconds). The minimum duration is used with the maximum when creating parallel image and audio playlists. The 'Default image duration' option allows the user to change the default duration for images. The default duration is used for images playing as part of an image sequence. The 'Maximum image duration' option allows the user to change the maximum duration for images. This option is used when images and audio are presented together. The 'Repeat forever (kiosk mode)' option causes the repeat count field for each playlist to be set to zero. If this option is not checked, the repeat count is set to '1' for each playlist. In one embodiment, the user may be given options to merge playlists or perform more advanced editing of the menu names and menu structures created automatically. Users can also create playlist files prior to executing the authoring software. Those skilled in the art will note that the authoring software may include more or less functionality than described herein and still be within the scope of embodiments of the invention.

Figure 6:
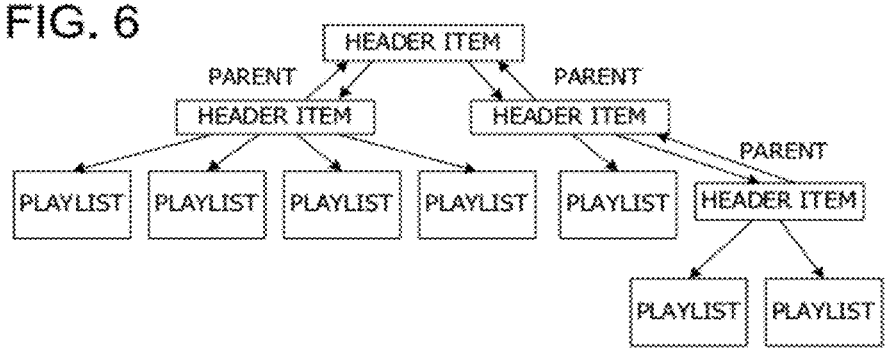
FIG. 6 is a block diagram illustrating an exemplary menu structure.

After any manual adjustments have been made to the hierarchical structure and/or the default playlists, a menu structure exists such as illustrated in the exemplary menu structure of FIG. 6. In one embodiment, the authoring software includes a menu simplifier that traverses the created menu structure searching for menus that have only one child. The menu simplifier removes any such menus and promotes the only child in the hierarchy to take the place of the removed menu. In this fashion, the menu simplifier reduces the complexity of the menu structure to simplify navigation by the user.

The authoring software writes a setup file (e.g., in extensible markup language) to the computer-readable medium recording both the default settings and any manual settings of the user. If the user later adds more media files to the same medium (e.g., a re-writeable medium), the authoring software examines the setup file to identify and apply those same settings. For example, if the user deletes all of the default playlists and selects only an 'All songs by lowest directory name' option, then such option will be the default for that computer-readable medium each time the user attempts to add media files to the medium. The authoring software identifies such customized options for the specific medium to the user.

Figure 7:
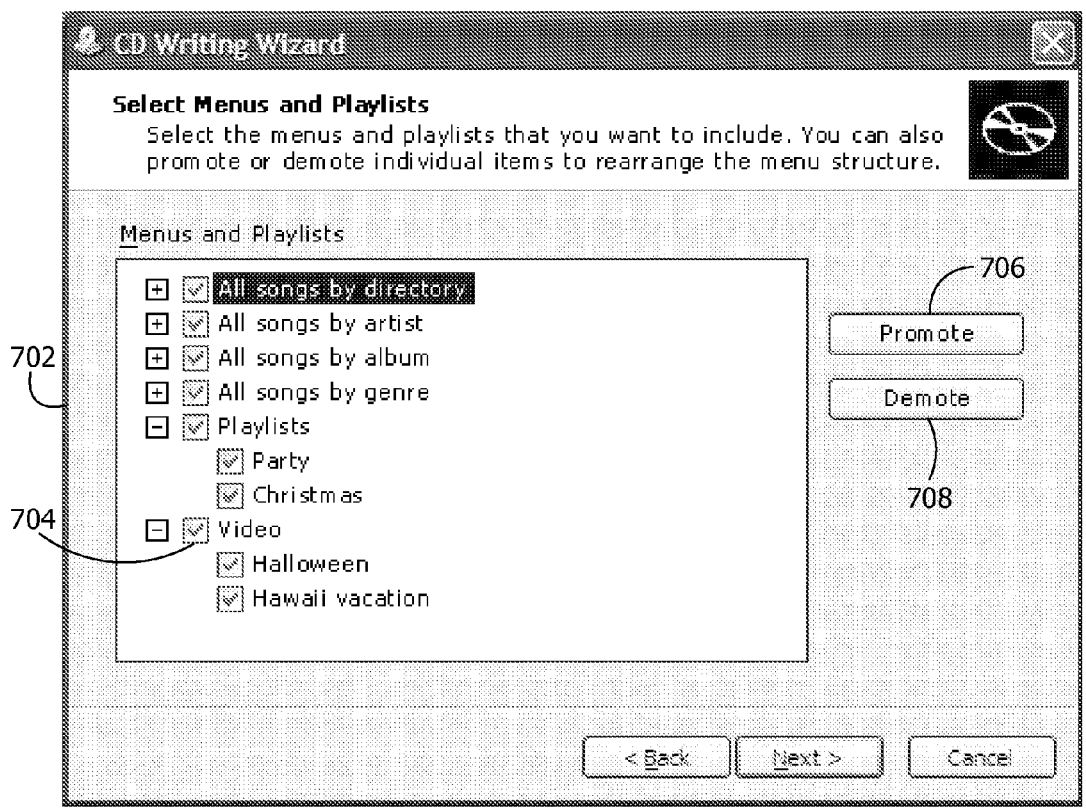
FIG. 7 is a screen shot of an exemplary user interface for the authoring software of an embodiment of the invention.

FIG. 7 is a screen shot of an exemplary user interface for the authoring software of an embodiment of the invention.

Data Structure for Playlists and Groups within Playlists

Those skilled in the art will note that there are many data structures suitable for the hierarchical structure, playlists, and groups within the playlists according to an embodiment of the invention. The following description is merely one example of the data structures, fields, and values that could be used to implement an embodiment of the invention.

A computer-readable medium stores a data structure representing a group within a playlist. The data structure includes, but is not limited to, a playlist group and a playlist header. The playlist group includes a group header and group data. The group header includes a group number field storing a value identifying the playlist group. The group number field stores a value corresponding to a group description for the playlist group. The group header further includes an offset field storing a reference to another playlist group. In one embodiment, the offset field stores a memory location offset to a next playlist group, a memory location offset to a previous playlist group, and/or a pointer to a memory location associated with another group. The group header further includes a playlist group type field storing a value identifying a data type for the group of media files. The data type includes, but is not limited to, one of the following: audio, video, timed image, and parallel image audio. The group data references a group of media files, and includes a starting point field and an ending point field. The starting point field stores a value representing a starting point of playback. The point field stores a value representing an ending point of playback. The playlist header includes a playlist summary type field storing a value identifying a type for the group of media files. The type comprises audio, video, or image.

Figure 8:
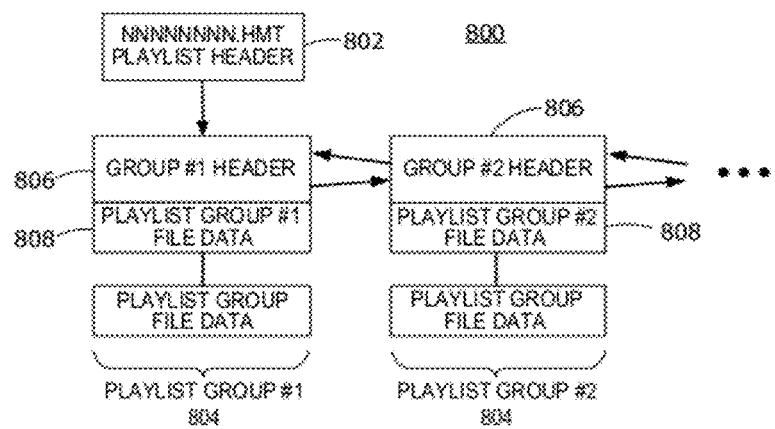
FIG. 8 is an exemplary block diagram illustrating the structure of a playlist having one or more groups.

In the embodiment of FIG. 8, each playlist is represented as a unique file having a name of the format "nnnnnnnn.HMT," where nnnnnnnn is a hexadecimal number that represents a Playlist File ID in CONTENTS.HMT (see Appendix A). For example, the Playlist File IDs may be a sequential list of hexadecimal numbers (i.e., 00000001, 00000002, etc.). These playlist files are created in a subdirectory of the root such as \HIGHMAT\PLAYLIST. There could be, for example, four different types of playlist groups: Audio (A), Video (V), Timed Image (TI), and Parallel Image Audio (PIA). The specific structure of each group in this embodiment is outlined below.

The playlist file includes a playlist header 802 (see Table 1) followed by one or more playlist groups 804 (see Table 2) such as Playlist Group #1 and Playlist Group #2. Each playlist group 804 includes, but is not limited to, a group header 806 and playlist group file data 808. The file is written such that there are no gaps between the data structures in the file.

TABLE 1

Playlist Header

| Offset | Length | Field Name |
| --- | --- | --- |
| 0 | 8 | Identifier |
| 8 | 2 | Version |
| 10 | 1 | Playlist Summary Type (Audio, Image, Video) |
| 11 | 1 | Repeat Count |
| 12 | 4 | Thumbnail ID |
| 16 | 4 | Number of Groups |
| 20 | 2 | Special Flags |

TABLE 2

One or More Groups

| | |
| --- | --- |
| 4 | Offset of next Group (0 if last group) |
| 4 | Offset of previous Group (0 if first group) |
| 4 | Group Number |
| 1 | Type of Playlist Group (A, V, TI, PIA) |
| 1 | Reserved |
| Variable | Group data |

The Identifier field in the Playlist Header stores an eight byte entry containing "PLISTHMT" in ASCII. The Version field stores a two byte entry representing the version of the compressed media format specification used to author this file. For example version 1.20 would be stored as 0x78 (120 decimal). The Playlist Summary Type field is a one byte entry summarizing the types of all the individual playlists entries contained within it. The summary type is created by logically OR'ing the values in the following table together.

TABLE 3

Playlist Summary Type

| Playlist Type | Value |
| --- | --- |
| $00000000_b$ | INVALID |
| $00000001_b$ | AUDIO FILES ARE PRESENT |
| $00000010_b$ | VIDEO FILES ARE PRESENT |
| $00000100_b$ | IMAGE FILES ARE PRESENT |
| All other values | Reserved |

The Playlist Summary Type allows players to filter the list of playlists to show only the playlists that they can play, e.g. an audio-only player can exclude all playlists that contain images or video. The Repeat Count field is a one byte entry representing the number of times to repeat the playback of this playlist. If this playlist is invoked with a starting point, then each repetition finishes with the file immediately preceding the starting point. A value of zero indicates an infinite repeat count. For example, given three groups Group A, Group B and Group C and a Repeat Count of two, the playback order is A, B, C, A, B, and C. For the same three groups with a Starting Group Index of two, the playback order is B, C, A, B, C, and A.

The Thumbnail ID field is a four byte entry representing the index of the Thumbnail for this playlist in CONTENTS.HMT. If there is no thumbnail for this playlist, then the value is zero. The Number of Groups field is a four byte entry representing the count of Playlist Groups. The Special Flags field is a two byte entry reserved for future use. The Offset of Next Group is a four byte entry representing the offset from the beginning of nnnnnnnn.HMT to the next playlist group. This entry is zero if it is the last playlist group. The Offset of Previous Group field is a four byte entry representing the offset from the beginning of nnnnnnnn.HMT to the previous playlist group. This entry is zero if it is the first playlist group. The Group Number field is a four byte entry representing the number of this group. The group number can be used to lookup the group name in TEXT.HMT. Group numbers are sequential starting at 1 and are unique for all groups in all playlists. The Type of Playlist Group field is a one byte entry representing the Playlist type defined in the following table.

TABLE 4

Playlist Group Type

| Playlist Type | Value |
|---|---|
| 0 | Audio (A) |
| 1 | Video (V) |
| 2 | Timed Image (TI) |
| 3 | Parallel Image Audio (PIA) |
| 4-255 | Reserved |

The format of the group data for each of these playlist group types is defined in the following sections. Media players not capable of playing types 3 and 4 nevertheless give a good experience when presented with such playlist entries. A PIA sequence is rendered as a Timed Image sequence (ignoring the audio). The Reserved field is a one byte entry reserved for future use. The Group data field represents the place in the format of the actual playlist group data. The format of each playlist group is defined below.

Audio Playlist Group

The following table lists the fields for the Audio Playlist Group.

TABLE 5

Audio Playlist Group (A)

| Offset | Length | Field Name |
|---|---|---|
| 0 | 4 | Number of Audio Files |
| 4 | 4 | Audio File ID 1 |
| 8 | 4 | Starting Point of Audio 1 |
| 12 | 4 | Ending Point of Audio 1 |
| 16 | 8 | Starting Offset Audio 1 |
| 24 | 8 | Ending Offset Audio 1 |
| ... | | |
| 4 + 28*(n − 1) | 4 | Audio File ID n |
| 8 + 28*(n − 1) | 4 | Starting Point of Audio n |
| 12 + 28*(n − 1) | 4 | Ending Point of Audio n |
| 16 + 28*(n − 1) | | Starting Offset Audio n |
| 24 + 28*(n − 1) | | Ending Offset Audio n |

The Number of Audio Files field is a four byte entry representing the number of Audio file ID's that are listed in this group. There is an Audio File ID field (a four byte entry) for each Audio file in this group. The value is the index of the Audio file in CONTENTS.HMT. There is a Starting point of Audio field (a four byte entry) for each Audio file in this group. The value is the offset in milliseconds to the starting point of playback. There is an Ending point of Audio field (a four byte entry) for each Audio file in this group. The value is the offset in milliseconds to the ending point of playback. A value of zero indicates play to the end of the file. The player recognizes the case where two sequential files have the same File ID and the Ending point of the first file and the starting point of the next file are equal. Playback should continue uninterrupted.

In another embodiment, the Audio Playlist Group in Table 5 includes only the following fields: Number of Audio Files and Audio File ID 1 through Audio File ID n. The starting and ending points of audio and offsets for each audio file in the group are omitted.

Video Playlist Group

The following table lists the fields for the Video Playlist Group.

TABLE 6

Video Playlist Group (V)

| Offset | Length | Field Name |
|---|---|---|
| 0 | 4 | Number of Video Files |
| 4 | 4 | Video File ID 1 |
| 8 | 4 | Starting Point of Video 1 |
| 12 | 4 | Ending Point of Video 1 |
| ... | | |
| 4 + 12*(n − 1) | 4 | Video File ID n |
| 8 + 12*(n − 1) | 4 | Starting Point of Video n |
| 12 + 12*(n − 1) | 4 | Ending Point of Video n |

Players may automatically resize the video to fill the display. The Number of Video Files field is a four byte entry representing the number of Video file ID's that are listed in this Video Playlist Group. There is a Video File ID field (a four byte entry) for each Video file in this group. The value is the index of the Video file in CONTENTS.HMT. There is a Starting point of Video field (a four byte entry) for each Video file in this group. The value is the offset in milliseconds to the starting point of playback. There is an Ending point of Video field (a four byte entry) for each Video file in this group. The value is the offset in milliseconds to the ending point of playback. A value of zero indicates play to the end of the file. The player recognizes the case where two sequential files have the same File ID and the Ending point of the first file and the starting point of the next file are equal, then playback should continue uninterrupted.

Timed Image Group

The following table lists the fields for the Timed Image Group.

TABLE 7

Timed Image Group (TI)

| Offset | Length | Field Name |
|---|---|---|
| 0 | 4 | Number of Image Files |
| 4 | 2 | Initial Transition |
| 6 | 2 | Final Transition |
| 8 | 4 | Image File ID 1 |
| 12 | 4 | Duration 1 |
| 16 | 2 | Transition 1 |
| ... | | |
| 8 + 10*(n − 1) | 4 | Image File ID n |
| 12 + 10*(n − 1) | 4 | Duration n |
| 16 + 10*(n − 1) | 2 | Transition n |

The Number of Image Files field is a four byte entry representing the number of Image file ID's that are listed in this group. The Initial Transition field is a two byte entry defining the initial transition to be used to display the first image in the playlist. Exemplary allowed values include CUT and FADE IN. The Final Transition field is a two byte entry defining the final transition to be used to end the display the last image in the playlist. Exemplary allowed values include CUT and FADE OUT. There is an Image File field (a four byte entry) for each Image file in this group. The value is the index of the Image file in CONTENTS.HMT. The Duration field is a four byte entry representing the duration to display the image in milliseconds; a value of zero represents infinity. The minimum image duration in a Timed Image Playlist Group is five seconds. The Transition field is a two byte entry defining the type of transition to use when the player changes to the next image. A value of zero is defined as CUT, but other values are available in other embodiments. The list of transitions is defined in the following table.

TABLE 8

Transition Type

| Type of Entry | Value |
| --- | --- |
| 0 | CUT |
| 1 | FADE IN/FADE OUT |
| 2 | DISSOLVE |
| 3 | WIPE FROM TOP |
| 4 | WIPE FROM BOTTOM |
| 5 | WIPE FROM LEFT |
| 6 | WIPE FROM RIGHT |
| 7 | WIPE DIAGONAL LEFT |
| 8 | WIPE DIAGONAL RIGHT |
| 9-65,535 | RESERVED |

The duration of the transition is manufacturer defined. The transition duration does affect the image duration defined above. For example, a transition of two seconds duration between images of durations twenty and thirty seconds respectively would result in nineteen seconds of the first image followed by two seconds of transition between the images followed by twenty-nine seconds of the second image.

Parallel Image Audio Playlist Group

When implementing the next/previous playlist item function, players step through the Timed Image Playlist Group. The player synchronizes the audio to the next/previous image. The following table lists the fields in the parallel image audio playlist group.

TABLE 9

Parallel Image Audio Playlist Group (PIA)

| Length | Field Name |
| --- | --- |
| 4 | Offset of Audio Playlist Group |
| Variable | Timed Image Playlist Group (TI) |
| Variable | Audio Playlist Group (A) |

The Offset of Audio Playlist Group field is a four byte entry representing the offset from the beginning of nnnnnnnn.HMT to the Audio playlist group inside the PIA entry. The Timed Image Playlist Group field identifies the Timed Image group (see below). The Audio Playlist Entry field identifies the Audio Playlist group (see below).

Exemplary Operating Environment

Figure 9:
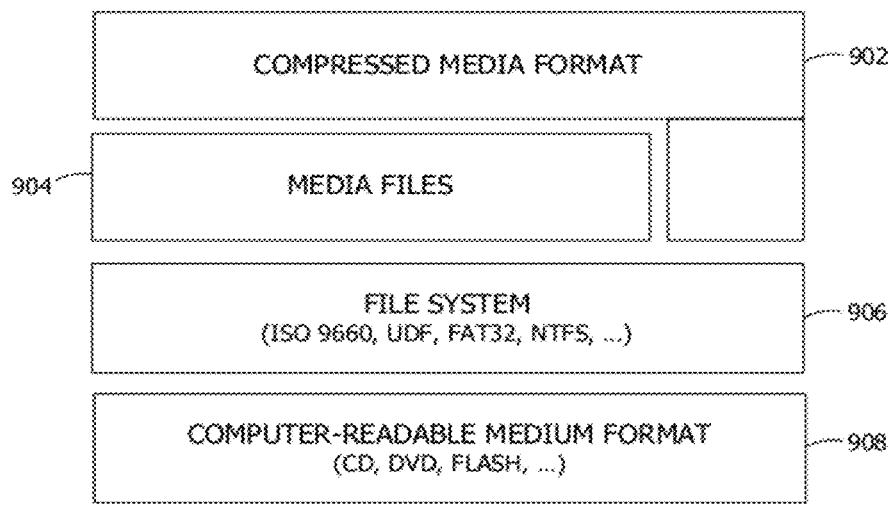
FIG. 9 is a block diagram illustrating an exemplary compressed media format for use with an embodiment of the invention.

Referring now to FIG. 9, an embodiment of the invention is operable as part of an exemplary compressed media format 902 having a set of small files containing metadata, menus, and playlists in a compiled binary format designed for playback on feature-rich PC media players as well as low cost media players. See APPENDIX A for an example of accelerator files for use as part of a compressed media format. The exemplary compressed media format 902 of an embodiment of the invention encompasses audio, still images, and video media files in various formats. The compressed media format 902 defines a logical format for organizing compressed media files 904 in a file system 906 on computer-readable media 908 such as optical discs (e.g., CD-ROM, CD-R, CD-RW, DVD-RAM, DVD-R, DVD-RW, DVD+RW, DVD+R, DVD-ROM), flash memory (e.g., COMPACTFLASH brand, secure digital, MEMORY STICK brand), magnetic media (e.g., hard disks), and the like.

Figure 10:
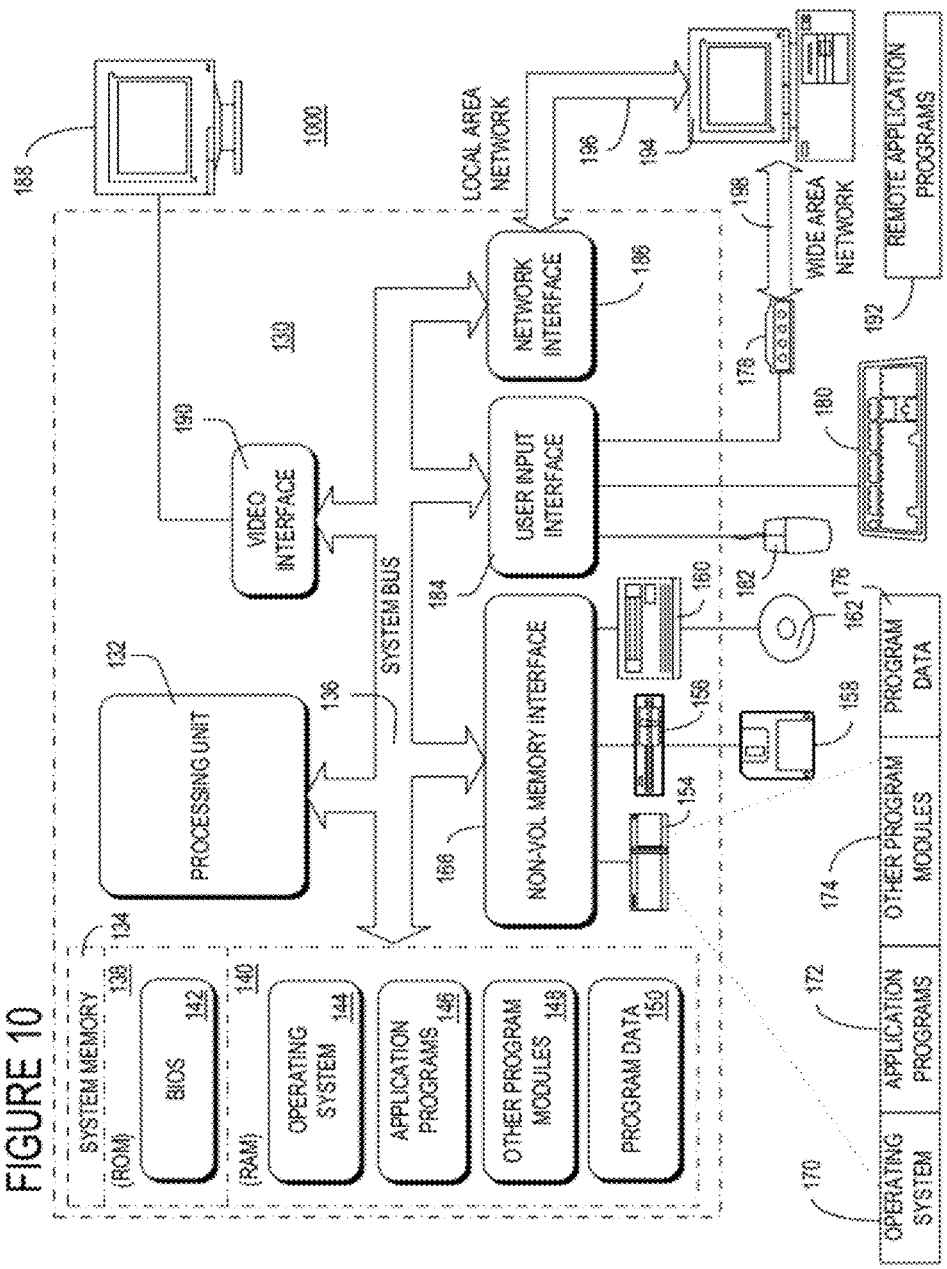
FIG. 10 is a block diagram illustrating one example of a suitable computing system environment in which an embodiment of the invention may be implemented.

FIG. 10 shows one example of a general purpose computing device in the form of a computer 130. In one embodiment of the invention, a computer such as the computer 130 is suitable for use in the other figures illustrated and described herein. Computer 130 has one or more processors or processing units 132 and a system memory 134. In the illustrated embodiment, a system bus 136 couples various system components including the system memory 134 to the processors 132. The bus 136 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 130 typically has at least some form of computer readable media. Computer readable media, which include both volatile and nonvolatile media, removable and non-removable media, may be any available medium that can be accessed by computer 130. By way of example and not limitation, computer readable media comprise computer storage media and communication media. Computer storage media include volatile and nonvolatile, removable and non-removable media implemented in any method or technology for storage of information such as computer readable instructions, data structures, program modules or other data. For example, computer storage media include RAM, ROM, EEPROM, flash memory or other memory technology, CD-ROM, digital versatile discs (DVD) or other optical disc storage, magnetic cassettes, magnetic tape, magnetic disk storage or other magnetic storage devices, or any other medium that can be used to store the desired information and that can be accessed by computer 130. Communication media typically embody computer readable instructions, data structures, program modules, or other data in a modulated data signal such as a carrier wave or other transport mechanism and include any information delivery media. Those skilled in the art are familiar with the modulated data signal, which has one or more of its characteristics set or changed in such a manner as to encode information in the signal. Wired media, such as a wired network or direct-wired connection, and wireless media, such as acoustic, RF, infrared, and other wireless media, are examples of communication media. Combinations of the any of the above are also included within the scope of computer readable media.

The system memory 134 includes computer storage media in the form of removable and/or non-removable, volatile and/or nonvolatile memory. In the illustrated embodiment, system memory 134 includes read only memory (ROM) 138 and random access memory (RAM) 140. A basic input/output system 142 (BIOS), containing the basic routines that help to transfer information between elements within computer 130, such as during start-up, is typically stored in ROM 138. RAM 140 typically contains data and/or program modules that are immediately accessible to and/or presently being operated on by processing unit 132. By way of example, and not limitation, FIG. 10 illustrates operating system 144, application programs 146, other program modules 148, and program data 150.

The computer 130 may also include other removable/non-removable, volatile/nonvolatile computer storage media. For example, FIG. 10 illustrates a hard disk drive 154 that reads from or writes to non-removable, nonvolatile magnetic media. FIG. 10 also shows a magnetic disk drive 156 that reads from or writes to a removable, nonvolatile magnetic disk 158, and an optical disc drive 160 that reads from or writes to a removable, nonvolatile optical disc 162 such as a CD-ROM or other optical media. Other removable/non-removable, volatile/nonvolatile computer storage media that can be used in the exemplary operating environment include, but are not limited to, magnetic tape cassettes, flash memory cards, digital versatile discs, digital video tape, solid state RAM, solid state ROM, and the like. The hard disk drive 154, and magnetic disk drive 156 and optical disc drive 160 are typically connected to the system bus 136 by a non-volatile memory interface, such as interface 166.

The drives or other mass storage devices and their associated computer storage media discussed above and illustrated in FIG. 10, provide storage of computer readable instructions, data structures, program modules and other data for the computer 130. In FIG. 10, for example, hard disk drive 154 is illustrated as storing operating system 170, application programs 172, other program modules 174, and program data 176. Note that these components can either be the same as or different from operating system 144, application programs 146, other program modules 148, and program data 150. Operating system 170, application programs 172, other program modules 174, and program data 176 are given different numbers here to illustrate that, at a minimum, they are different copies.

A user may enter commands and information into computer 130 through input devices or user interface selection devices such as a keyboard 180 and a pointing device 182 (e.g., a mouse, trackball, pen, or touch pad). Other input devices (not shown) may include a microphone, joystick, game pad, satellite dish, scanner, or the like. These and other input devices are connected to processing unit 132 through a user input interface 184 that is coupled to system bus 136, but may be connected by other interface and bus structures, such as a parallel port, game port, or a Universal Serial Bus (USB). A monitor 188 or other type of display device is also connected to system bus 136 via an interface, such as a video interface 190. In addition to the monitor 188, computers often include other peripheral output devices (not shown) such as a printer and speakers, which may be connected through an output peripheral interface (not shown).

The computer 130 may operate in a networked environment using logical connections to one or more remote computers, such as a remote computer 194. The remote computer 194 may be a personal computer, a server, a router, a network PC, a peer device or other common network node, and typically includes many or all of the elements described above relative to computer 130. The logical connections depicted in FIG. 10 include a local area network (LAN) 196 and a wide area network (WAN) 198, but may also include other networks. Such networking environments are commonplace in offices, enterprise-wide computer networks, intranets, and global computer networks (e.g., the Internet).

When used in a local area networking environment, computer 130 is connected to the LAN 196 through a network interface or adapter 186. When used in a wide area networking environment, computer 130 typically includes a modem 178 or other means for establishing communications over the WAN 198, such as the Internet. The modem 178, which may be internal or external, is connected to system bus 136 via the user input interface 184, or other appropriate mechanism. In a networked environment, program modules depicted relative to computer 130, or portions thereof, may be stored in a remote memory storage device (not shown). By way of example, and not limitation, FIG. 10 illustrates remote application programs 192 as residing on the memory device. It will be appreciated that the network connections shown are exemplary and other means of establishing a communications link between the computers may be used.

Generally, the data processors of computer 130 are programmed by means of instructions stored at different times in the various computer-readable storage media of the computer. Programs and operating systems are typically distributed, for example, on floppy disks or CD-ROMs. From there, they are installed or loaded into the secondary memory of a computer. At execution, they are loaded at least partially into the computer's primary electronic memory. The embodiments of the invention described herein include these and other various types of computer-readable storage media when such media contain instructions or programs for implementing the steps described below in conjunction with a microprocessor or other data processor. Embodiments of the invention also include the computer itself when programmed according to the methods and techniques described herein.

For purposes of illustration, programs and other executable program components, such as the operating system, are illustrated herein as discrete blocks. It is recognized, however, that such programs and components reside at various times in different storage components of the computer, and are executed by the data processor(s) of the computer.

Although described in connection with an exemplary computing system environment, including computer 130, an embodiment of the invention is operational with numerous other general purpose or special purpose computing system environments or configurations. The computing system environment is not intended to suggest any limitation as to the scope of use or functionality of embodiments of the invention. Moreover, the computing system environment should not be interpreted as having any dependency or requirement relating to any one or combination of components illustrated in the exemplary operating environment. Examples of well known computing systems, environments, and/or configurations that may be suitable for use with embodiments of the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

Embodiments of the invention may be described in the general context of computer-executable instructions, such as program modules, executed by one or more computers or other devices. Generally, program modules include, but are not limited to, routines, programs, objects, components, and data structures that perform particular tasks or implement particular abstract data types. Embodiments of the invention may also be practiced in distributed computing environments where tasks are performed by remote processing devices that are linked through a communications network. In a distributed computing environment, program modules may be located in both local and remote computer storage media including memory storage devices.

In operation, computer 130 executes computer-executable instructions such as those illustrated in FIG. 4 and FIG. 5 to group media files within a playlist to enable navigation among groups.

EXAMPLES

Figure 11:
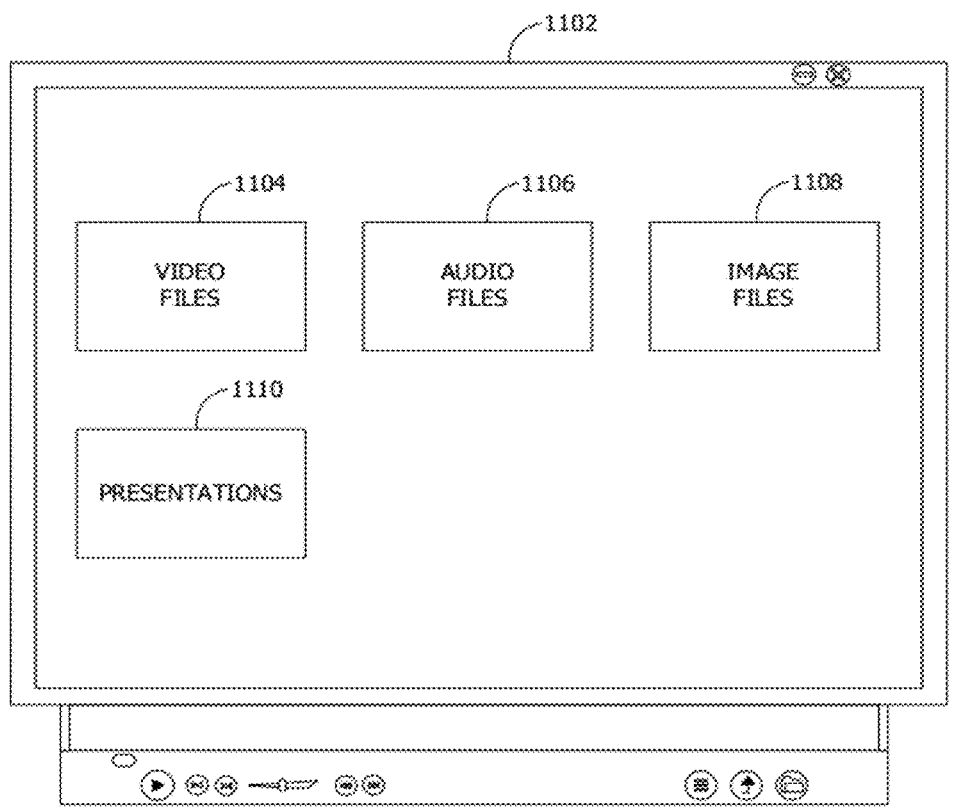
FIG. 11 is a screen shot of an exemplary user interface of playback software of an embodiment of the invention illustrating the media types available for rendering.
Figure 12:
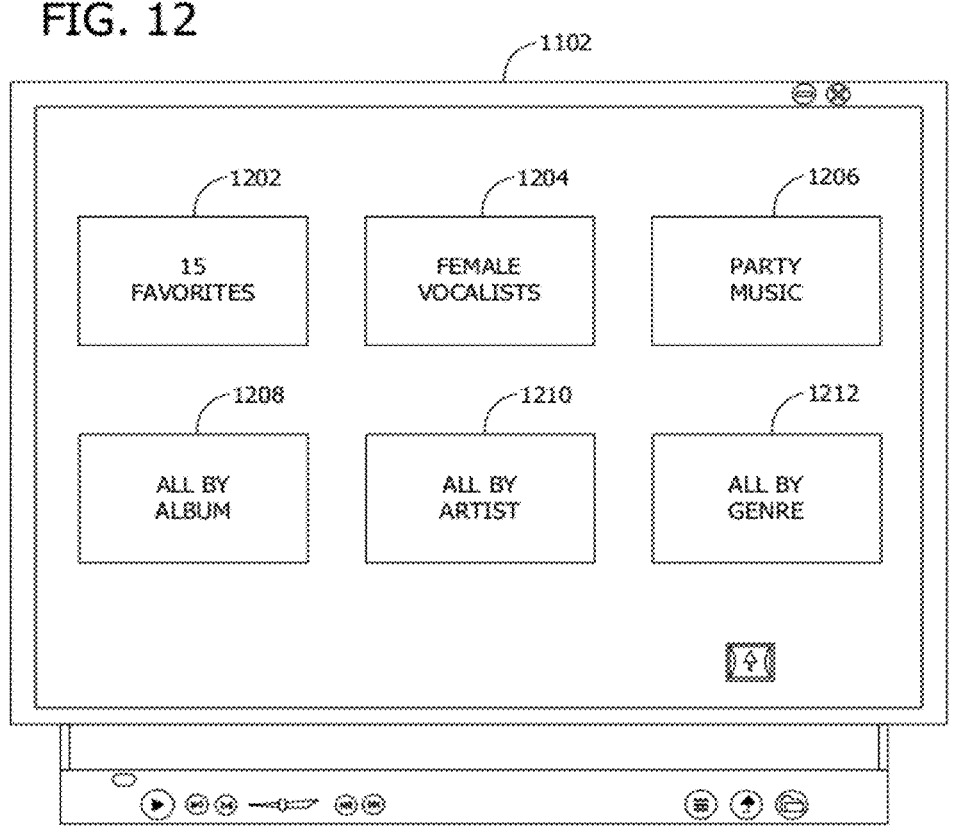
FIG. 12 is a screen shot of an exemplary user interface of playback software of an embodiment of the invention illustrating several audio playlists.
Figure 13:
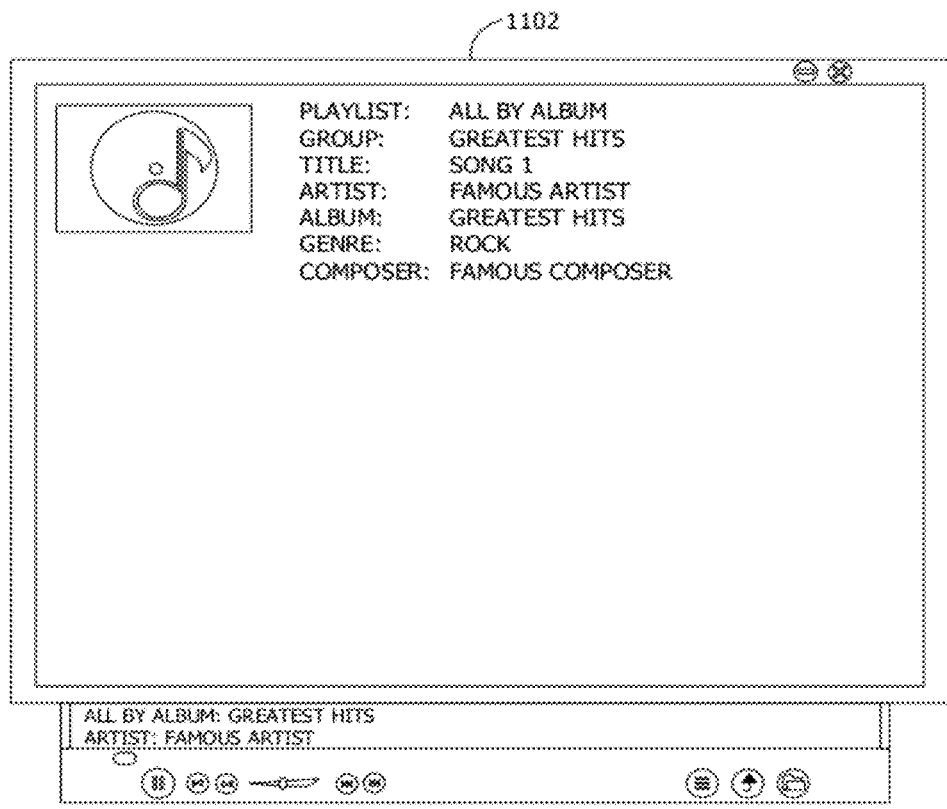
FIG. 13 is a screen shot of an exemplary user interface of playback software of an embodiment of the invention illustrating rendering of an audio playlist where the media content is grouped by album.
Figure 14:
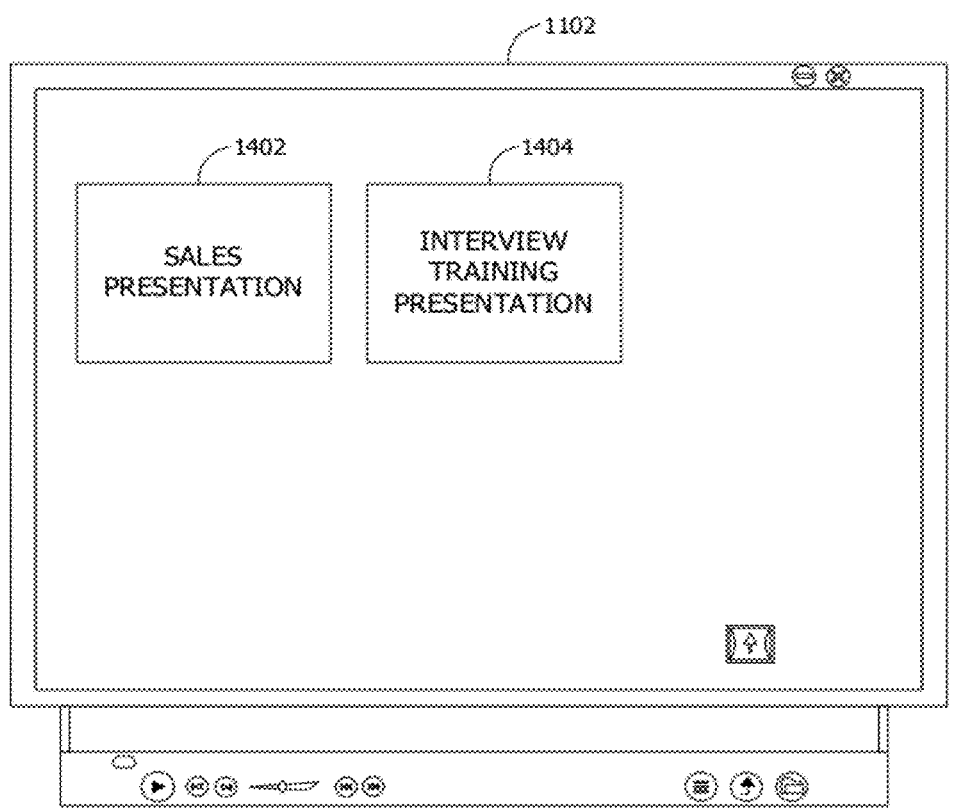
FIG. 14 is a screen shot of an exemplary user interface of playback software of an embodiment of the invention illustrating multimedia playlists.
Figure 15:
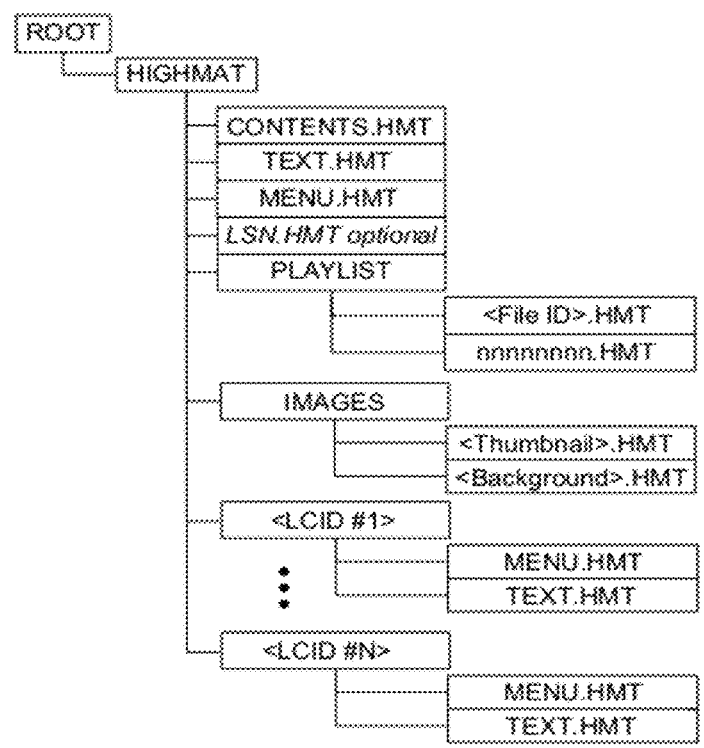
FIG. 15 is an exemplary block diagram illustrating a file system structure for the memory optimizing data.
Figure 16:
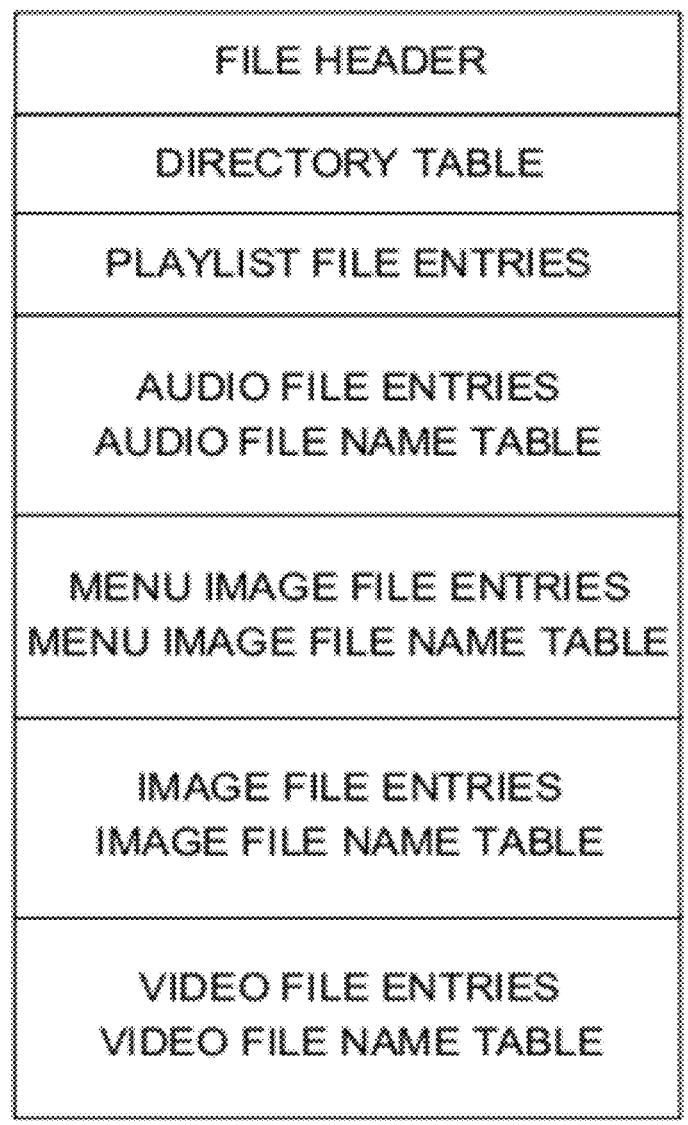
FIG. 16 is an exemplary block diagram illustrating a data structure representing information about all the media files on a computer-readable medium.

The following examples illustrate embodiments of the invention. The software and data structures of an embodiment of the invention are operable in systems including, but not limited to, media players and media authoring systems. For example, FIG. 11 is a screen shot of an exemplary user interface 1102 of playback software of an embodiment of the invention illustrating the media types available for rendering. In the example of FIG. 11, user interface 1102 displays icons indicating menu options 1104, 1106, 1108, and 1110 to select video files, audio files, image files, and presentations, respectively. FIG. 12 is a screen shot of user interface 1102 after the audio files menu option 1106 is selected by the user. Playlists i1202, 1204, 1206, 1208, 1210, and 1212 in FIG. 12 are entitled "15 Favorites," "Female Vocalists," "Party Music," "All by Album," "All by Artist," and "All by Genre" respectively. FIG. 13 is a screen shot of user interface 1102 after the user selects the "All by Album" playlist 1208. The exemplary user interface 1102 displays the name of the playlist and information about the media content currently being rendered. For example, the information may identify the playlist, the group within the playlist, title, artist, album, genre, or composer. FIG. 14 is a screen shot of user interface 1102 after the user selects the presentations menu option 1110. The exemplary presentations in FIG. 14 include a sales presentation 1402 and an interview training presentation 1404.

Embodiments of the invention support various scenarios. For example, a user can select a large number of songs from a music library, arrange them in directories, and burn them to a CD-R using any CD burning software. The user can listen to the disc in a car, in a portable CD player, on a computer at work, or on any other capable CD playback device. The user uses album, artist, genre or directory-based playlists to select listening material. In another example, a user creates a slide show of digital still images from a vacation, adds some music, and saves the result to a CD-R that can be played in a DVD player. Similarly, after connecting a digital camcorder to a computer, the user selects an option on the computer to create a CD from the camcorder recording. Later, the user takes the disc containing a copy of the camcorder recording and inserts it in a DVD player or other video capable player. A menu appears from which the user navigates quickly to any event that was on the tape by skipping forward by shot, by day, or by event. In addition, the user can go back to the computer, delete a few shots or footage, add music, add titles and make copies of the improved version to send to relatives and friends. The relatives and friends can view the copies on either a new DVD player or other video capable player or on their existing PC. In yet another example, a digital camcorder records video onto an eight centimeter disc. The disc works directly in a computer or a DVD player, offering random access and editing capabilities in both environments. In another scenario, the user renders, on a consumer electronic device, content stored on a remote computer-readable medium. For example, the user, from the consumer electronic device, accesses a computer-readable medium on a remote computer via a network. The computer-readable medium stores media files and grouping information according to an embodiment of the invention. The user navigates the media files to select and render desired content on the consumer electronic device.

When implemented in the context of a compressed media format, embodiments of the invention provide numerous advantages. An embodiment of the invention brings together the computer's greatest strengths in digitizing, organizing and editing media with the CD or DVD player's greatest strengths in convenient media playback. Embodiments of the invention also serve as a medium for recording information in future consumer electronics devices (camcorders and DVD/CD-recorders). To consumers, aspects of the invention represent an easy way to navigate their photographs, home video, and music on their TV, on their portable CD player and in their car. It does this in an extremely affordable way using their existing CD-R drive, affordable CD-R media and a new DVD or car audio player that is comparably priced to similar devices lacking this capability. Using DVD recordable media, users can view and listen to vast collections of photographs, home video and music off a single disc. To consumer electronics manufacturers, embodiments of the invention represent a way to offer a compelling new feature to consumers for little additional cost. It uses the same hardware (same drives, same memory buffers) together with decoding chips and logic to support the compressed media format.

The order of execution or performance of the operations in embodiments of the invention illustrated and described herein is not essential, unless otherwise specified. That is, the operations may be performed in any order, unless otherwise specified, and embodiments of the invention may include additional or fewer operations than those disclosed herein. For example, it is contemplated that executing or performing a particular operation before, contemporaneously with, or after another operation is within the scope of aspects of the invention.

Embodiments of the invention may be implemented with computer-executable instructions. The computer-executable instructions may be organized into one or more computer-executable components or modules. Aspects of the invention may be implemented with any number and organization of such components or modules. For example, aspects of the invention are not limited to the specific computer-executable instructions or the specific components or modules illustrated in the figures and described herein. Other embodiments of the invention may include different computer-executable instructions or components having more or less functionality than illustrated and described herein.

When introducing elements of aspects of the invention or the embodiments thereof, the articles "a," "an," "the," and "said" are intended to mean that there are one or more of the elements. The terms "comprising," "including," and "having" are intended to be inclusive and mean that there may be additional elements other than the listed elements.

Having described aspects of the invention in detail, it will be apparent that modifications and variations are possible without departing from the scope of aspects of the invention as defined in the appended claims. As various changes could be made in the above constructions, products, and methods without departing from the scope of aspects of the invention, it is intended that all matter contained in the above description and shown in the accompanying drawings shall be interpreted as illustrative and not in a limiting sense.

What is claimed is:

1. A computerized method executable by a processor of a computing device comprising:
   receiving a list of user selected media files having associated grouping criteria, said selected media files being accessible by the computing device;
   first selecting one or more additional media files according to a first grouping criteria of the associated grouping criteria to define a first playlist;
   second selecting one or more additional media files according to a second grouping criteria of the associated grouping criteria to define a second playlist;
   generating a container group associated with the first playlist and the second playlist, said generated container group comprising a first value identifying the first playlist and a second value identifying the second playlist, wherein the first playlist references the user selected media files and the first selected additional media files defined therein, and wherein the second playlist references the user selected media files and the second selected additional media files defined therein, said container group further comprising a reference from the first playlist to the second playlist to enable navigation between the first playlist and the second playlist; and
   providing the first playlist, the second playlist, the first selected media files associated with the first playlist, the second selected media files associated with the second playlist, and container group to a user.

2. The method of claim 1, wherein the list of user selected media files comprises one or more of the following: audio files, video files, and image files.

3. The method of claim 1, further comprising storing the provided first playlist, second playlist, first selected media files associated with the first playlist, second selected media files associated with the second playlist, and container group on a storage medium accessible by the computing device.

4. The method of claim 1, said container group further comprising:
   a data field for storing a description of the container group;
   a data field for storing the first value identifying the first playlist; and
   a data field for storing the second value identifying the second playlist.

5. The method of claim 4, said container group further comprising:
   a starting offset field storing a value representing a physical byte starting offset for the first playlist; and
   an ending offset field storing a value representing a physical byte ending offset for the first playlist.

6. The method of claim 1, said container group including:
   a starting point field storing a value representing a starting point of playback of the first playlist; and
   an ending point field storing a value representing an ending point of playback of the first playlist.

7. The method of claim 1, wherein one or more computer-readable storage media has stored thereon instructions for performing the steps of receiving, first selecting, second selecting, generating, and providing.

8. A system comprising:
   a computer processor; and
   a computer-readable storage media having stored thereon computer processor-executable instructions, said instructions executable by the computer processor for:
      receiving a list of user selected media files having associated grouping criteria, said selected media files being accessible by the computing device;
      first selecting one or more additional media files according to a first grouping criteria of the associated grouping criteria to define a first playlist;
      second selecting one or more additional media files according to a second grouping criteria of the associated grouping criteria to define a second playlist;
      generating a container group associated with the first playlist and the second playlist, said generated container group comprising a first value identifying the first playlist and a second value identifying the second playlist, wherein the first playlist references the user selected media files and the first selected additional media files defined therein, and wherein the second playlist references the user selected media files and the second selected additional media files defined therein, said container group comprising a plurality of data fields for storing information to enable navigation between the first playlist and the second playlist by the user, said information stored in at least one of the data fields comprising a reference from the first playlist to the second playlist; and
      storing the first playlist, second playlist, first selected media files associated with the first playlist, second selected media files associated with the second playlist, and container group on a computer-readable medium.

9. The system of claim 8, said instructions executable by the computer processor further comprising instructions for displaying a navigation element to the user based on the reference from the first playlist to the second playlist and instructions for navigating between the first playlist and the second playlist responsive to the user selecting the navigation element.

10. The system of claim 8, said data fields of the container group further comprising:
   a data field for storing a description of the container group;
   a data field for storing the first value identifying the first playlist; and
   a data field for storing the second value identifying the second playlist.

11. The system of claim 10, said container group further comprising:
   a starting offset field storing a value representing a physical byte starting offset for the first playlist; and
   an ending offset field storing a value representing a physical byte ending offset for the first playlist.

12. The system of claim 8, said container group including:
   a starting point field storing a value representing a starting point of playback of the first playlist; and
   an ending point field storing a value representing an ending point of playback of the first playlist.

13. One or more computer-readable storage media having stored thereon computer executable components executed by a computing device, said computer-readable storage media comprising:
   a playlist module for:
      receiving a list of user selected media files having associated grouping criteria, said selected media files being accessible by the computing device;
      first selecting one or more additional media files according to a first grouping criteria of the associated grouping criteria to define a first playlist; and
      second selecting one or more additional media files according to a second grouping criteria of the associated grouping criteria to define a second playlist;
   a population module for generating a container group associated with the first playlist and the second playlist, said generated container group comprising a first value identifying the first playlist and a second value identifying the second playlist, wherein the first playlist references the user selected media files and the first selected additional media files defined therein, and wherein the second playlist references the user selected media files and the second selected additional media files defined therein, said container group further comprising a reference from the first playlist to the second playlist to enable navigation between the first playlist and the second playlist by the user; and an interface module for providing the first playlist, second playlist, first selected media files associated with the first playlist, second selected media files associated with the second playlist, and container group to a user.

14. The computer-readable storage media of claim 13, further comprising a writer module for storing the provided first playlist, second playlist, first selected media files associated with the first playlist, second selected media files associated with the second playlist, and container group on a storage medium accessible by the computing device.

15. The computer-readable storage media of claim 13, said container group further comprising:
- a data field for storing a description of the container group;
- a data field for storing the first value identifying the first playlist;
- a data field for storing the second value identifying the second playlist;
- a starting offset field storing a value representing a physical byte starting offset for the first playlist; and
- an ending offset field storing a value representing a physical byte ending offset for the first playlist.

16. The computer-readable storage media of claim 13, said container group including:
- a starting point field storing a value representing a starting point of playback of the first playlist; and
- an ending point field storing a value representing an ending point of playback of the first playlist.

* * * * *